United States Patent Office
3,223,727
Patented Dec. 14, 1965

3,223,727
REDUCTION OF AROMATIC NITRO AND NITROSO COMPOUNDS
Harvey Irvin Stryker, Carney's Point, N.J., assignor to E. I. du Pont de Nemours and Company, Wilmington, Del., a corporation of Delaware
No Drawing. Filed Feb. 18, 1963, Ser. No. 259,427
4 Claims. (Cl. 260—510)

This application is a continuation-in-part of my application Serial No. 16,129, filed March 31, 1961, now abandoned.

This invention is directed to an improved separation method for isolating amino compounds of the general structure $H_2N$—Q—X, where Q is a benzene or naphthalene nucleus, X represents an OH, $SO_3H$, or COOH group and compounds having the structure

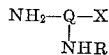

wherein Q is benzene, X is a radical selected from the group consisting of —$SO_3H$ and —COOH, when said X is —$SO_3H$, R is a radical selected from the group consisting of H and $C_{1-4}$ alkyl and when said X is —COOH, R is H, from the aqueous solutions of their sodium salts as obtained by reducing the corresponding nitro (or nitroso) or amino nitro (or nitroso) compounds with sodium sulfide or sodium sulfhydrate. This significant and unexpected improvement is based on the use of liquid or gaseous sulfur dioxide for neutralizing these solutions to a pH of 7.5 or lower, where these aminophenols or amino acids show a sufficiently low solubility in this system to be separated directly from the reduction solutions as the free amino bases, without evolution of hydrogen sulfide, and without contamination of the separated products by elemental sulfur. An important feature of the present invention is the discovery that the pertinent amino compounds are, by this new separation method, obtained in almost quantitative yields and in excellent quality if prolonged exposure to air-oxygen at elevated temperatures is avoided during and after the treatment with sulfur dioxide.

Representative examples of amino compounds which may be separated according to this invention include the following commercial products:

o-Aminophenol (from o-nitrophenol)
p-Aminophenol (from p-nitrophenol or from p-nitrosophenol)
m-Aminobenzoic acid (from m-nitrobenzoic acid)
p-Aminobenzoic acid (from p-nitrobenzoic acid)
Metanilic acid (from m-nitrobenzenesulfonic acid)
C acid (3-amino-1,5-napthalenedisulfonic acid)
3,4-Diaminobenzoic acid (from 4-amino-3-nitrogenzoic acid)
5-amino-2-isopropylaminobenzenesulfonic acid (from 2-isopropylamino-5-nitrobenzenesulfonic acid)
2,5-diaminobenzenesulfonic acid (from 2-amino-5-nitrobenzenesulfonic acid)

Ever increasing costs for operating labor and for special equipment required for the manufacture of these amino products, based on iron and acid, or on catalytic hydrogen reductions of the nitro compounds, make it necessary to replace these reduction processes by the fundamentally less costly sodium sulfhydrate reduction. To do this economically, it is necessary to modify the heretofore employed, cumbersome separation method in a manner which would permit separating the final product directly from the reduction solutions in high yields and in the state of high purity demanded in the trade.

Catalytic hydrogenation is a current method favored by those who manufacture the pure, colorless grade of p-aminophenol demanded in the trade; this process, however, is inherently costly and hazardous. It requires a large capital investment for high pressure equipment and the handling of large amounts of hydrogen gas under pressure. This process also calls for the use of a high-priced catalytic metal which must be recovered and reactivated by a tedious procedure to render the process economically acceptable. 4-amino-3-nitrobenzoic acid is reduced with difficulty by catalytic methods.

It is, therfore, an object of the present invention to provide an improved novel process for producing amino compounds in almost quantitative yields and in high quality. It is a further object of this invention to reduce nitro compounds in a system such that the final reduced product may be separated from the reduction solution in high yields and high purity. These and other objects will become apparent in the following description and claims.

More specifically, the present invention is directed to the process for reducing compounds of the general structure Y—Q—X, where Y may be —$NO_2$ or —NO, Q being a benzene or a naphthalene nucleus, X represents at least one —OH, —$SO_3H$, or —COOH group, or a combination of these groups and compounds having the structure

wherein Y is a radical selected from the group consitsing of —$NO_2$ and —NO, Q is benzene, X is a radical selected from the group consisting of —$SO_3H$ and —COOH, when said X is —$SO_3H$, R is a radical selected from the group consisting of H and $C_{1-4}$ alkyl and when said X is —COOH, R is H, to the corresponding amino compounds with sodium sulfide or sulfhydrate, the improvement being one wherein the free amino base is precipitated directly from the original crude or clarified solution by a treatment with liquid or gaseous sulfur dioxide until a pH within the range of 7.5 to 3.5 is reachd, and where during and after this treatment, prolonged exposure of the solution or suspension at elevated temperatures to atmospheric oxygen is avoided.

A preferred embodiment of the heretofore described invention utilizes an excess of sodium sulfhydrate as the reducing agent, in the presence of caustic alkalinity, precipitation of the product with $SO_2$, followed by filtering or centrifuging the suspension at 10° to 30° C., and washing the cake with cold water containing less than 0.1% of sodium hydrosulfite until substantially free of other inorganic salts.

The present invention is based on the discovery that the treatment of the alkaline reduction solutions containing an excess of sodium sulfhydrate and much sodium thiosulfate, with liquid or gaseous sulfur dioxide, does not liberate hydrogen sulfide, and does not cause precipitation of elemental sulfur. It was further unexpectedly found that the free amino bases of the type heretofore defined can be separated in almost quantitative yields and excellent purity, provided that the formation of sulfonated by-products is avoided, or substantially suppressed in large scale operation, by avoiding prolonged exposure of the solutions or suspensions during and after the $SO_2$ treatment to air-oxygen.

The success of this invention does not depend on a particular manner in which the sodium sulfide or sulfhydrate reduction is carried out. It is customary, and generally preferred for the reduction of the heretofore described nitrobodies to employ in the reduction step caustic alkalinity, which is known to render $Na_2S$ and $NaSH$ more effective as reducing agents, and which prevents any precipitation of elemental sulfur during this step of the process. This also keeps the nitro or nitroso compounds and all reaction products, including the final, amphoteric amines, in solution as the sodium salts. The use of liquid or gaseous $SO_2$, instead of employing sodium bisulfite, has the important advantage that it does not increase the sodium ion concentration and thus makes it possible to use a minimum amount of diluting water. This assures achieving maximum production capacity in an available piece of plant equipment, and it also avoids excessive losses of product by its solubility in the final filtrate. At relatively higher sodium ion concentrations significantly more water must be used to keep the product in solution during the clarification step (at 85–95° C.), and relatively more water also is needed to remove the inorganic salts from the final filter cake. While the clarification treatment (to remove extraneous material), and a complete removal of inorganic salts from the final product, are optional with some of the technical intermediates disclosed, these refinements are necessary in the manufacture of the special high quality p-aminophenol sold as a photographic developer or for conversion to the N-acetyl derivative for pharmaceutical uses. As is disclosed in the literature (Beilstein and Seidell's "Solubilities of Organic Compounds," 3rd (1941) edition, pp. 421–2), the solubility of these amphoteric amino compounds in neutral water is at room temperature in the range of 1–2%, but increases near the boiling point at least tenfold.

The conditions regarding the temperature and duration of the sulfur dioxide treatment are not critical, provided that prolonged exposure of the reaction solution at elevated temperatures to oxygen is avoided. Under such oxidative conditions, a Piria type reaction (first reported in Annalen, 78 (1851), pp. 31–35) is believed to occur between the amino compound and the $SO_2$, whereby a sulfonic acid group is introduced into the amino-compound, rendering it extremely soluble in the aqueous system, even at room temperature; this side reaction may be avoided by carrying out all operations under a blanket of nitrogen gas. In cases where it is not necessary to clarify after $SO_2$ treatment, it is often advantageous to add $SO_2$ to the previously cooled solution, at 10 to 30° C. At these cool temperatures, there is no need to operate in an inert atmosphere.

The total amount of liquid or gaseous sulfur dioxide to be used is conveniently controlled by pH determinations. On a plant scale, the average $SO_2$ consumption required to reach the isoelectric point (pH approx. 7.0) was found to correspond reasonably well to the theoretical value calculated by assuming that for each $Na^+$ ion present in this aqueous system one monovalent sulfurous acid ion (equivalent to half a mole $SO_2$) must be introduced. However, the use of a somewhat larger amount is preferred to make sure that the originally present sodium salts of these amphoteric amines are completely converted to the free hydroxy, carboxy or sulfonic groups. It is an important advantage of this new separation method that the use of an excess of $SO_2$ is not harmful. Even when in an exploratory experiment (separating p-aminophenol from a NaSH and NaOH reduction) the $SO_2$ treatment was continued until a pH of 2 was reached, not the slightest trace of the highly toxic $H_2S$ gas could be detected in the effluent gases by employing a test paper which is highly sensitive to the presence of $H_2S$ in the air, and the final product was obtained in excellent yield and quality, and entirely free of contamination with elemental sulfur. When, on the other hand, other relatively weak acids, including acetic and boric acids, were used in place of sulfur dioxide under otherwise identical conditions copious hydrogen sulfide fumes escaped from the reaction solution when the isoelectric point (pH=7.0–7.5) was reached.

The pH range heretofore cited is preferred for the separation of aminophenols according to this invention; when dealing with arylaminocarboxylic or sulfonic acids, a somewhat lower pH range (3.5 to 4.5) is preferred, since at a higher pH these compounds are somewhat more soluble in the final filtrate.

The present invention is restricted, in respect to the neutralizing agent, to the use of liquid or gaseous sulfur dioxide. The preferred form in which this agent is employed is determined solely by practical considerations, such as size of the charge and type of available equipment. On a plant scale, it is expedient to discharge liquid $SO_2$ directly from the shipping container, through an immersed pipe, into the agitated reduction solution, while dissipating the neutralization heat by external cooling. As earlier discussed, the air above the liquor level should be replaced by an inert gas, such as nitrogen or gaseous $SO_2$, and it is important to avoid prolonged exposure of the hot solution or of the filter cake to air-oxygen. It is preferred, therefore, to employ a reaction vessel equipped with moderate speed agitation and a cover, and to use nitrogen gas in place of press-air for removing the excess mother liquor and wash water from the press cake. As a further precaution against air-oxidation of the separated aminophenols, and to minimize the loss of product caused by its water-solubility, it is preferred to cool the suspension, prior to the final filtration, to about 10° C., and to employ as the wash water cold water containing a little sodium hydrosulfite, which serves as an effective stabilizer (preventing discoloration by oxidation products) during conventional drying and finishing operations.

In the production of mono-amino compounds, it is expedient, and it is one of the incidental advantages of this invention, to carry out the $SO_2$ treatment immediately after the conventional reduction temperature of approximately 85–95° C. The $SO_2$-treated solution can then, if desired, be clarified, without delay at this temperature, by passing it through a conventional line filter, while transferring the charge with nitrogen gas pressure from the reducer to the crystallizer, where it is cooled at a controlled rate to produce the final product in the form of the well-defined crystals demanded in the trade. If desired, the reduction solution may first be cooled to any convenient temperature in the same or in another vessel and treated with sulfur dioxide until the isoelectric point is reached, and then filtered directly to isolate the precipitated amino compound; or the neutralized charge may be re-heated to the clarification temperature, if a colorless, high quality product is demanded.

When the present invention is utilized to produce 3,4-diaminobenzoic acid, it is preferred to add the $SO_2$ to the previously cooled (10 to 30° C.) reaction mixture.

When dealing with the heretofore described amino acids, where the pH is preferably adjusted to approximately 4 and when ordinary iron equipment is used for the reduction step, possible corrosion problems can be avoided by resorting to a two-step sulfur dioxide treatment. According to this embodiment of the present invention, the alkalinity of the reduction solution is first adjusted at the reduction temperature to a pH not lower than 7. The solution, which may be clarified at this pH, is then transferred to a crystallizer (preferably made of non-corrosive construction material), where the small additional amount of sulfur dioxide needed to adjust the pH to 3.5 to 4, is added to the hot or cooled solution.

The separation method according to this invention is applicable to any water-soluble aromatic amino acid or aminophenol, or to a mixture of both types of compounds, or to compounds containing amino, hydroxy, and carboxy or sulfonic acid groups in the same molecule. It is, however, of practical interest only for those compounds which can be produced by reduction of the corresponding nitro or nitroso compounds with sodium sulfide, or equivalent reducing agents, and which are too highly soluble as their alkali metal salts to be substantially completely precipitated from their original (alkaline) reduction solutions by the addition of sodium chloride, or other low-priced alkali metal salts, and cooling. In addition to the specific representative examples of pertinent amino compounds cited earlier, this new separation method is also of commercial interest in the manufacture of the aminosalicylic acids made by sodium sulfide or sulfhydrate reduction from the corresponding nitrosalicylic acids.

Representative examples illustrating the present invention are as follows. All parts are by weight unless otherwise indicated.

EXAMPLE 1

A. *Laboratory preparation*

To a solution containing 98.3 parts of sodium sulfhydrate (NaSH), 38.7 parts of sodium hydroxide, and 481 parts of water, there was added, at approximately 40° C. under agitation, 240.5 parts of an aqueous filter press cake containing 172.2 parts of technical p-nitrophenol, sodium salt. The charge was heated at reflux for 4 hours, and then diluted with 2250 parts of water, which lowered the temperature to 70–80° C. While stirring the solution at this temperature, gaseous sulfur dioxide was introduced under the level of the liquid until the solution showed a pH of 7.5, whereupon 9 parts of Darco S–51 (a powdered grade of activated carbon used as decolorizing agent and filter aid, marketed by the Darco Dept. of the Atlas Powder Co., New York) was added, and the mixture was heated to reflux and filtered hot. The filtrate was cooled at a slow and uniform rate under mechanical stirring to 10° C., and the precipitated product was filtered off. The cake was washed with a displacement wash in the form of a cold (10° C.), highly diluted solution of sodium hydrosulfite, and then dried in an oven. The yield was 97 parts (corresponding to 92.5% of theory) of colorless, storage-stable crystals, which showed by nitrite analysis a purity of 98.6% and which by a routine sulfur analysis was found to be free of sulfur. No odor of hydrogen sulfide was detected during the neutralization step, and no cloudiness (which would occur if elemental sulfur would be formed) was observed in the solution during or after the $SO_2$ treatment.

B. *Plant scale manufacture*

When several attempts were made to duplicate these laboratory results in large plant equipment where the neutralization (using liquid $SO_2$ from a cylinder) and the clarification operations took more than five hours, while the solution was constantly exposed to the influence of air-oxygen at temperatures of 80° to 100° C., a similar high-quality product (free of tarry or colored impurities) was obtained, but the yields were at least 20% lower than expected. The final filtrate from these charges was found to contain large amounts of a highly soluble amino acid, which in its organic-bound sulfur content corresponded to a monosulfonic acid of p-aminophenol. It was discovered that the formation of this by-product did not occur, and that the excellent laboratory performance heretofore described, was fully duplicated on a manufacturing scale when undue exposure to the air was avoided by carrying out the neutralization and clarification operation under a blanket of nitrogen gas in accordance with the present invention.

In two exploratory laboratory experiments, the alkaline solution (resulting from the sodium sulfhydrate reduction of p-nitrophenol, sodium salt) was neutralized to a pH of 7.0–7.5 by the addition of either acetic or boric acids, copious hydrogen sulfide fumes evolved in both cases from the solutions before the isoelectric point was reached, and the solutions became cloudy, due to the precipitation of sulfur. In a strictly comparable experiment, using $SO_2$ as the neutralizing agent, a sensitive test showed the effluent gases to be entirely free of $H_2S$, even when the $SO_2$ treatment was continued to a pH down to 2.0.

In another experiment, sulfuric acid was used for the neutralization of a solution obtained by reducing the nitroso compound with NaSH+NaOH, the p-aminophenol showed 1.89% sulfur content.

EXAMPLE 2

A. *Laboratory preparation*

To a solution containing 24 parts of sodium sulfhydrate, 17 parts of sodium hydroxide, and 159 parts water there was added at 40–45° C. under stirring 52 parts of an aqueous filter cake containing 35.2 parts of technical p-nitrosophenol. The reduction was complete after stirring for 15 minutes at 40–45° C. After adding 250 parts of water, gaseous sulfur dioxide was introduced under the surface of the liquid until a pH of 7.6 was reached. A small amount (3 parts) of Darco S–51 was then added, and the suspension was heated to reflux, where the solution was filtered. The filtrate was cooled to 10° C. at a rate of 15° C. per hour, and the colorless crystals were filtered off. The cake was washed with cold water, and then dried, giving 31 parts (87% of the theoretical yield) of p-aminophenol, showing by nitrite analysis a purity of 98.9%. No liberated hydrogen sulfide or precipitation of elemental sulfur was detected during or after the neutralization with sulfur dioxide.

B. *Plant scale manufacture*

The yield and high quality performance heretofore described was practically duplicated in several plant charges, in which 457 parts of p-nitrosophenol (as aqueous press cake) was reduced by heating in an aqueous solution containing 260 parts of sodium sulfhydrate and 186 parts of sodium hydroxide for 15 minutes at 40–50° C., followed by neutralizing the diluted charge at this temperature to a pH of 7.5. This required a total of 260 parts of sulfur dioxide. After adding 10 parts of Darco S–51, the suspension was heated to 95–100° C. The solution was clarified by passing it under nitrogen gas pressure through a line filter, and then cooled at a rate of 15° C. per hour to 10° C., where the colorless crystals were filtered off. The cake was washed with a displacement wash of cold (10° C.) water in which 10 parts of sodium hydrosulfite had been dissolved, and then dried in an oven or in a graining bowl in an atmosphere of sulfur dioxide. Average yields on the order of 90% of theory were demonstrated in the large scale manufacture of p-aminophenol by this reduction and new separation processes, starting with technical p-nitrosophenol made by the nitrosation of phenol. No liberation of $H_2S$ and no precipitation of elemental sulfur were observed in any of these plant charges.

EXAMPLE 3

A solution of 99.2 parts (0.594 mole) of technical p-nitrobenzoic acid in 360 parts of water containing 21.6 parts (0.54 mole) of sodium hydroxide was heated to 90–95° C., and 58 parts (1.04 mole) of sodium sulfhydrate was added slowly under agitation. The solution was further heated for one hour at 105° C., and then cooled to 75° C., where a sufficient amount of sulfur dioxide was introduced to lower the pH to 7.0 to 7.2. A small amount (1.5 parts) of Darco S–51 and 420 parts of water were then added, and the solution was clarified. After adding 0.2 part of sodium hydrosulfite, the solution was further treated at 70–75° C. with sulfur dioxide until it was faintly acid to Congo Red test paper, showing a pH of close to 4.0. This required a total of 48 parts (0.75 mole) of sulfur dioxide. The small amount of sodium hydrosulfite was added in order to reduce some small amounts of azoxy-type impurities, formed during the reduction step, to p-aminobenzoic acid. The clarified solution was cooled at the rate of 10–15° C., and stirred for one hour at 15° C. in order to complete the precipitation of p-aminobenzoic acid, which then was filtered off. The cake was washed with two displacement washes of cold water, and dried in an oven, yielding 70 parts (86% of theory) of p-aminobenzoic acid of excellent appearance and free of sulfur detectable by conventional analysis.

EXAMPLE 4

A solution of 49.2 parts of sodium hydroxide and 67.4 parts of sodium sulfhydrate dissolved in 211 parts water was heated to reflux, and 300 parts of a 41.7% aqueous solution of the sodium salt of m-nitrobenzenesulfonic acid, equivalent to 125.1 parts (0.556 mole), was added within 45 minutes. The mixture was stirred at reflux for 12 hours, and then cooled to room temperature. Gaseous sulfur dioxide was then passed into the agitated solution until the pH had dropped to 3.9. This did not cause a detectable odor of hydrogen sulfide, or any visible precipitation of elemental sulfur. The suspension was cooled to approximately 20° C., and the colorless crystals were filtered off. The filtrate was then cooled in an ice bath, which gave a second crop of product, which was filtered off. Further cooling of this second filtrate gave a third crop of product. The over-all yield of metanilic acid thus obtained was nearly theoretical (96.2 parts) as calculated on the basis of nitrite analysis (M.W.=173.1 for the free metanilic acid) and on the weights of the wet filter cakes which averaged close to 50% in metanilic acid content. The appearance and chemical purity of the product was fully equal to that of the technical product obtained by reducing the same starting material by the conventional manufacturing process with iron and acid.

EXAMPLE 5

To 300 parts of a solution containing 34.1 parts of the monosodium salt of 3-nitro-1,5-naphthalenedisulfonic acid (M.W.=355.6), there was added 26 parts of a 30% sodium hydroxide solution and 26.5 parts of a 41.1% sodium sulfhydrate solution. The mixture was heated under agitation to reflux, and kept at this temperature for 4 hours, which completely reduced the nitro compound to the amino compound. After cooling to room temperature, gaseous sulfur dioxide was passed into the solution until it showed only a faint pink color on phenolphthalein test paper. No elemental sulfur was precipitated during or after this SO₂ treatment. The monosodium salt of 3-amino-1,5-naphthalene-disulfonic acid (commonly known as C acid) thus formed, was then precipitated from the cooled solution by the addition of 20 parts of sodium chloride. The product was filtered off, giving 68 parts of a wet filter cake which by nitrite analysis showed a C acid content of 30.9%, corresponding to 21 parts (67.4% of the theoretical yield) of 3-amino-1,5-naphthalenedisulfonic acid, monosodium salt of the calculated molecular weight of 325.3. The product compared favorably in appearance and chemical purity to the average production of C acid made from the same technical nitro compound in approximately the same or slightly higher yield by reduction with iron and acid.

EXAMPLE 6

A solution consisting of 400 parts of water, 64 parts of 30% caustic soda solution and 87.5 parts of 4-amino-3-nitrobenzoic acid was heated to 75±5° C. At this temperature, 134.5 parts of a 40% sodium sulfhydrate solution was added over a period of 20 minutes, during which time the solution reached the reflux temperature, 103° C. The reaction mass was refluxed for four hours, cooled to 20° C.±5° C., 64 parts of 30% caustic soda solution were added and, while maintaining the temperature by cooling, sufficient sulfur dioxide gas was added over two hours to give a pH of 4.5±0.5. No hydrogen sulfide gas was detected. The precipitated solid, when filtered, washed with 800 parts of water and dried afforded 64 parts (88%) of 3,4-diaminobenzoic acid, M.P. 211–213.5° C. Percent S, 0.13.

When all (128 parts) of the caustic soda solution was added at the beginning, during or at the end of the reaction, equal yields and quality were obtained.

When, in this example, 78 parts of sodium bisulfite were used in place of the second 64 parts of 30% caustic soda solution, the yield and quality of the product were unchanged.

EXAMPLE 7

A solution consisting of 255 parts of water, 136 parts of 30% caustic soda and 133 parts of 2-isopropylamino-5-nitrobenzenesulfonic acid was heated to 80±5° C. At this temperature, 143 parts of a 40% sodium sulfhydrate solution were added over a period of 20 minutes, during which time the solution reached the reflux temperature, 101–104° C. The reaction mass was refluxed for 2.5 hours, cooled to 25° C., clarified by filtration and sufficient sulfur dioxide gas was added at 20–25° C. over a 30-minute period to give a pH of 4–4.5. The precipitated solid, when filtered, washed with 400 parts of water and dried afforded 108 parts (94%) of 5-amino-2-isopropylaminobenzenesulfonic acid, whose infrared spectrum is identical in every detail with that of an authentic sample, percent free S, 0.04.

When all (128 parts) of the caustic soda solution was added at the beginning, during or at the end of the reaction, equal yields and quality were obtained.

When in this example, 78 parts of sodium bisulfite were used in place of the second 64 parts of 30% caustic soda solution, the yield and quality of the product were unchanged.

Any of the heretofore described nitro compounds may be substituted in any of the preceding examples to give substantially the same results. It is understood that such routine variations as are made by one skilled in the art are also within the scope of the present invention.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. In the process of reducing a compound selected from the group consisting of (A) 3-nitro-1,5-naphthalenedisulfonic acid, (B) compounds having the structure Y—Q—X, wherein Y is a radical selected from the group consisting of —NO₂ and —NO; Q is an unsubstituted nucleus selected from the group consisting of benzene and naphthalene; and, X is a radical selected from the group consisting of —OH, —SO₃H and —COOH; and (C) compounds having the structure

wherein Y is a radical selected from the group consisting of —NO₂ and —NO, Q is benzene, X is a radical selected from the group consisting of —SO₃H and —COOH; when said X is —SO₃H, R is a radical selected from the group consisting of H and $C_{1-14}$ alkyl and when said X is —COOH, R is H, said compound being reduced to the corresponding amino compound with a member selected from the group consisting of sodium sulfide and sodium sulfhydrate, the improvement wherein the resulting free amino base is precipitated directly from its reducing medium by treating said reducing medium containing said free amino base with sulfur dioxide until a pH within the range of from 7.5–3.5 is reached, prolonged exposure to atmospheric oxygen at elevated temperatures being avoided during said process.

2. The process of claim 1 wherein p-nitrosophenol is reduced to p-aminophenol with sodium sulfhydrate.

3. The process of claim 1 wherein 4-amino-3-nitrobenzoic acid is reduced to 3,4-diaminobenzoic acid with sodium sulfhydrate.

4. The process of claim 1 wherein 2-isopropylamino-5-nitrobenzenesulfonic acid is reduced to 5-amino-2-isopropylaminobenzenesulfonic acid with sodium sulfhydrate.

References Cited by the Examiner
UNITED STATES PATENTS 1,822,122   9/1931   Binns et al. _____ 260—509

OTHER REFERENCES

Houben-Weyl, Methoden der Organischen Chemie, vol. 11, part 1, pp. 409–421, 490–494.

LORRAINE A. WEINBERGER, *Primary Examiner.*

LEON ZITVER, *Examiner.*